US011356432B2

(12) United States Patent
Tan

(10) Patent No.: US 11,356,432 B2
(45) Date of Patent: Jun. 7, 2022

(54) MOBILE SECURE NETWORK SYSTEM AND DEVICE

(71) Applicant: PenangBenny Consulting LLC, Rocky Hill, CT (US)

(72) Inventor: Alan Tan, Rocky Hill, CT (US)

(73) Assignee: SECURKART LLC, Rocky Hill, CT (US)

( * ) Notice: Subject to any disclaimer, the term of this patent is extended or adjusted under 35 U.S.C. 154(b) by 0 days.

(21) Appl. No.: 16/833,396

(22) Filed: Mar. 27, 2020

(65) Prior Publication Data

US 2021/0306310 A1    Sep. 30, 2021

(51) Int. Cl.
| | | |
|---|---|---|
| H04W 12/06 | (2021.01) | |
| H04L 9/40 | (2022.01) | |
| H04W 4/029 | (2018.01) | |
| H04L 67/52 | (2022.01) | |
| H04L 67/568 | (2022.01) | |

(52) U.S. Cl.
CPC .......... *H04L 63/08* (2013.01); *H04L 63/0428* (2013.01); *H04L 63/20* (2013.01); *H04L 67/18* (2013.01); *H04L 67/2842* (2013.01); *H04W 4/029* (2018.02); *H04W 12/06* (2013.01)

(58) Field of Classification Search
CPC ..... H04L 63/08; H04L 63/20; H04L 63/0248; H04L 67/18; H04L 67/2842; H04W 12/029; H04W 12/06; H04W 84/12; H04W 8/26
See application file for complete search history.

(56) References Cited

U.S. PATENT DOCUMENTS

| | | | | |
|---|---|---|---|---|
| 8,461,958 | B2 * | 6/2013 | Saenz | G06Q 10/087 349/3.1 |
| 9,418,497 | B2 * | 8/2016 | Ingle | G07C 9/00896 |
| 9,921,624 | B1 * | 3/2018 | Okamura | G06F 1/206 |
| 10,629,019 | B2 * | 4/2020 | Neely | H04L 63/20 |
| 2004/0044667 | A1 * | 3/2004 | Mahany | H04W 92/02 |
| 2009/0025435 | A1 * | 1/2009 | Popowski | E05B 47/06 70/91 |
| 2009/0165139 | A1 | 6/2009 | Yerazunis et al. | |
| 2011/0012709 | A1 | 1/2011 | Payson | |
| 2012/0280783 | A1 * | 11/2012 | Gerhardt | H04W 12/08 340/5.6 |

(Continued)

FOREIGN PATENT DOCUMENTS

EP    2677506 B1    3/2020

*Primary Examiner* — Jean A Gelin
(74) *Attorney, Agent, or Firm* — McInnes & McLane, LLP

(57) ABSTRACT

A mobile security system and device that provides a physically secured network device to extends a home network anywhere in the world where there is access to power is disclosed. The mobile security system and device has integrated logical and physical security and may be transported into an area with no internet connection and be self-sufficient and secured. The mobile security system and device includes a housing enclosing a computing apparatus, an access control mechanism to secure a door of the housing in a closed position, and a security control module to protect the data stored on the computing apparatus and provide authentication to access the enclosure. A back-up power supply supported by the housing and a wireless router to provide wireless network access to the remote home network may also be provided.

22 Claims, 4 Drawing Sheets

(56) References Cited

U.S. PATENT DOCUMENTS

| | | | |
|---|---|---|---|
| 2014/0214728 A1* | 7/2014 | Holmdahl | H04L 29/08 |
| | | | 705/412 |
| 2015/0247345 A1* | 9/2015 | Carpenter | E05B 47/026 |
| | | | 70/277 |
| 2016/0307681 A1* | 10/2016 | Shaffer | G07C 9/00309 |
| 2016/0323796 A1* | 11/2016 | Richter | H04W 36/32 |
| 2016/0328903 A1 | 11/2016 | Roberts | |
| 2018/0040181 A1* | 2/2018 | Groeger | G07C 9/30 |
| 2018/0063150 A1* | 3/2018 | Rovito | H04L 63/102 |
| 2018/0262891 A1* | 9/2018 | Wu | G07C 9/00857 |
| 2019/0057566 A1 | 2/2019 | Mlynarczyk | |
| 2020/0043271 A1* | 2/2020 | Anderson | F21V 33/006 |
| 2020/0410801 A1* | 12/2020 | Rahilly | E05B 65/0042 |
| 2021/0010315 A1* | 1/2021 | Honjo | E05F 15/71 |

* cited by examiner

MOBILE SECURE NETWORK SYSTEM AND DEVICE

FIELD

This disclosure relates to a mobile, secure network system and device, more specifically, to a physically and electronically protected mobile system for housing a computer network, which provides a secure extension of the computer network from a remote home network.

BACKGROUND

Data centers that house computer networks for the remote storage, processing, and/or distribution of large amounts of data are well known in the art. These data centers are configured according to the requirements of the user or for specific purposes, such as financial transaction processing, enterprise data storage, or global communications, to name but a few. The computer networks housed in the data centers store and transmit information essential to the user's operations. Security of data centers is a known issue to those of skill in the art and is accomplished by limiting and tracking physical access to the data centers. Because data centers house valuable information on the computer networks, most data centers contain lockable doors, cabinets and/or racks to limit access to the network components and power supplies supported therein.

Cabinet and/or rack security and monitoring in data centers hasn't changed much over the years. Traditionally racks and/or cabinets have a manual key to lock them. They may also have keycode access in addition or in lieu of a traditional key, and may utilize card reader technology to provide electronic access via smart locks that validate a user's credentials with a central server, responding with a signal to unlock the cabinet, or unlocking remotely when instructed by an authorized user. An audit log of users who have accessed the data center may also be maintained for tracking purposes.

SUMMARY

While security measures for data centers are generally effective because they are locked, hard to move, and contained within large secured rooms, mobile or portable server racks do not enjoy enhanced security as their mobile nature makes them vulnerable to break-ins. Mobile computer devices that can be utilized in remote locations are desirable for a variety of industries and reasons. Many industries send workers to remote areas where there is no internet connectivity, or to client locations where access to the clients' internet is undesirable for security or other reasons. A mobile secure system and device that provides security and accountability of the use of the computer network and equipment contained within the mobile security system, wherever it is located, is therefore desirable.

A physically and electronically protected mobile security system and device for housing computing apparatus, which provides a secure extension of a remote home network to a current location of the computing apparatus is disclosed herein. The mobile security system uses an identical, logistical and physical access control system as the parent facility. The mobile system includes a housing supporting the computing apparatus having a door to access the computing apparatus and may also include a back-up power supply supported thereon, a wireless router also supported by the housing to provide wireless network access to the remote home network, an access control mechanism to secure the door in a closed position to the housing, and a security module to protect the data stored on the computing apparatus and provide authentication to access the housing.

In one embodiment, the security module comprises a local cache of users with authorization to unlock the enclosure. The local cache can also be configured to track users who have accessed the credential reader. The security module may be configured to synchronize the local cache with a cache located on the remote home network. The local cache may also be used to cache data determined by a data center to be unnecessary to sync with the remote home network.

In another embodiment, the access control mechanism is configured to deny access to the enclosure if the security module fails to synchronize the local cache with the cache located on the remote home network. The mobile secure network device may include a kill switch to physically disable access to the enclosure by deactivating the credential reader upon a set number of tries by an unauthorized user, who is not matched to a user in the local cache of authorized users. In another embodiment, when the kill switch is activated it also clears the local cache and disables access to the remote home network. Upon activation of the kill switch, either by an attempted unauthorized user, or a forced physical breach, a fail secure device sends a signal to clear the local cache and disable remote access to the home network. The computing apparatus may also include a global positioning system supported by the housing so that the location of the secure network device can be tracked remotely, as desired, in case of a breach.

The mobile secure network system and device is a physically secured network device that allows anyone to extend their network anywhere in the world where there is access to power. Caching and bandwidth optimization within the router makes it possible for the system to operate as a full local datacenter environment in a remote location, even with very slow internet, because bandwidth optimization can synchronize the local cache as usage permits, while authorization requests are sent directly to the home datacenter as higher priority traffic. The mobile security system may be rolled into an area with no internet connection and be self-sufficient and secured. The mobile secure network system and device has integrated logical and physical security and has the capability of being fully portable.

BRIEF DESCRIPTION OF THE DRAWINGS

Various aspects of at least one embodiment are discussed below with reference to the accompanying figures, which are not necessarily drawn to scale, emphasis instead being placed upon illustrating the principles disclosed herein. The figures are included to provide an illustration and a further understanding of the various aspects and embodiments and are incorporated in and constitute a part of this specification but are not intended as a definition of the limits of any particular embodiment. The figures, together with the remainder of the specification, serve only to explain principles and operations of the described and claimed aspects and embodiments, but are not to be construed as limiting embodiments. In the figures, each identical or nearly identical component that is illustrated in various figures is represented by a like numeral. For purposes of clarity, not every component may be labeled in every figure.

DETAILED DESCRIPTION OF THE ILLUSTRATIVE EMBODIMENTS

Figure 1:
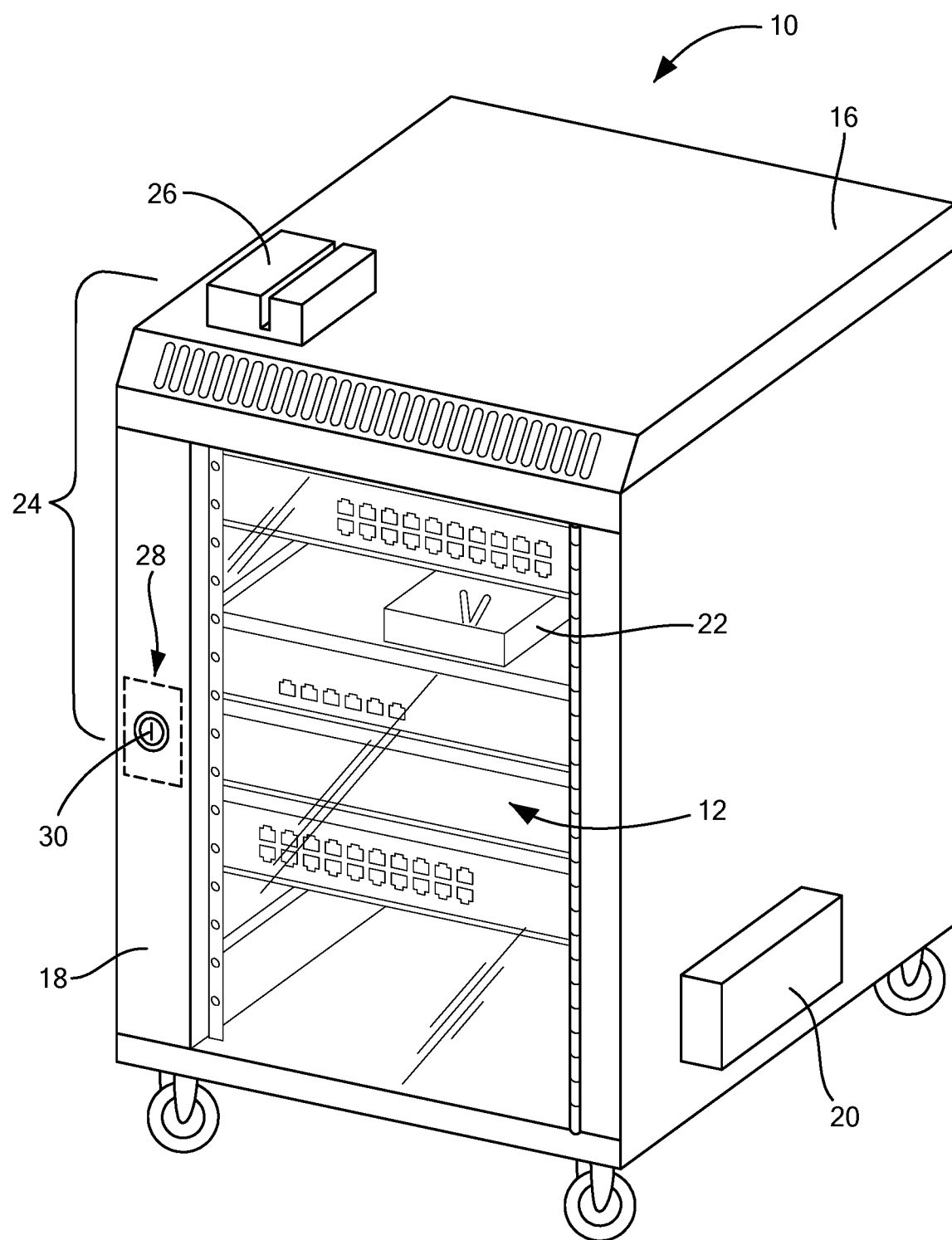
FIG. 1 is a perspective view of mobile secure network device in accordance with a first embodiment.

The examples of the system and device discussed herein are not limited in application to the details of construction and the arrangement of components set forth in the following description or illustrated in the accompanying drawings. It will be understood to one of skill in the art that the system and device is capable of implementation in other embodiments and of being practiced or carried out in various ways. Examples of specific embodiments are provided herein for illustrative purposes only and are not intended to be limiting. Also, the phraseology and terminology used herein is for the purpose of description and should not be regarded as limiting. Any references to examples, embodiments, components, elements or acts of the system and device herein referred to in the singular may also embrace embodiments including a plurality, and any references in plural to any embodiment, component, element or act herein may also embrace embodiments including only a singularity (or unitary structure). References in the singular or plural form are not intended to limit the presently disclosed system and device, its components, acts, or elements. As used herein, the singular forms "a", "an" and "the" are intended to include the plural forms as well, unless the context clearly indicates otherwise. The use of "including," "comprising," "comprises," "having," "containing," "involving," and variations thereof in the specification is meant to encompass the items listed thereafter and equivalents thereof but do not preclude the presence or addition of one or more other features or items. References to "or" may be construed as inclusive so that any terms described using "or" may indicate any of a single, more than one, and all of the described terms.

As will be appreciated by one skilled in the art, aspects of the system and device disclosed herein may be embodied as a system, method or device. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. Program code embodied on a computer readable medium may be transmitted using any appropriate medium, including but not limited to wireless, wireline, optical fiber cable, RF, etc., or any suitable combination of the foregoing.

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. In referencing the flowchart illustrations and/or block diagrams, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
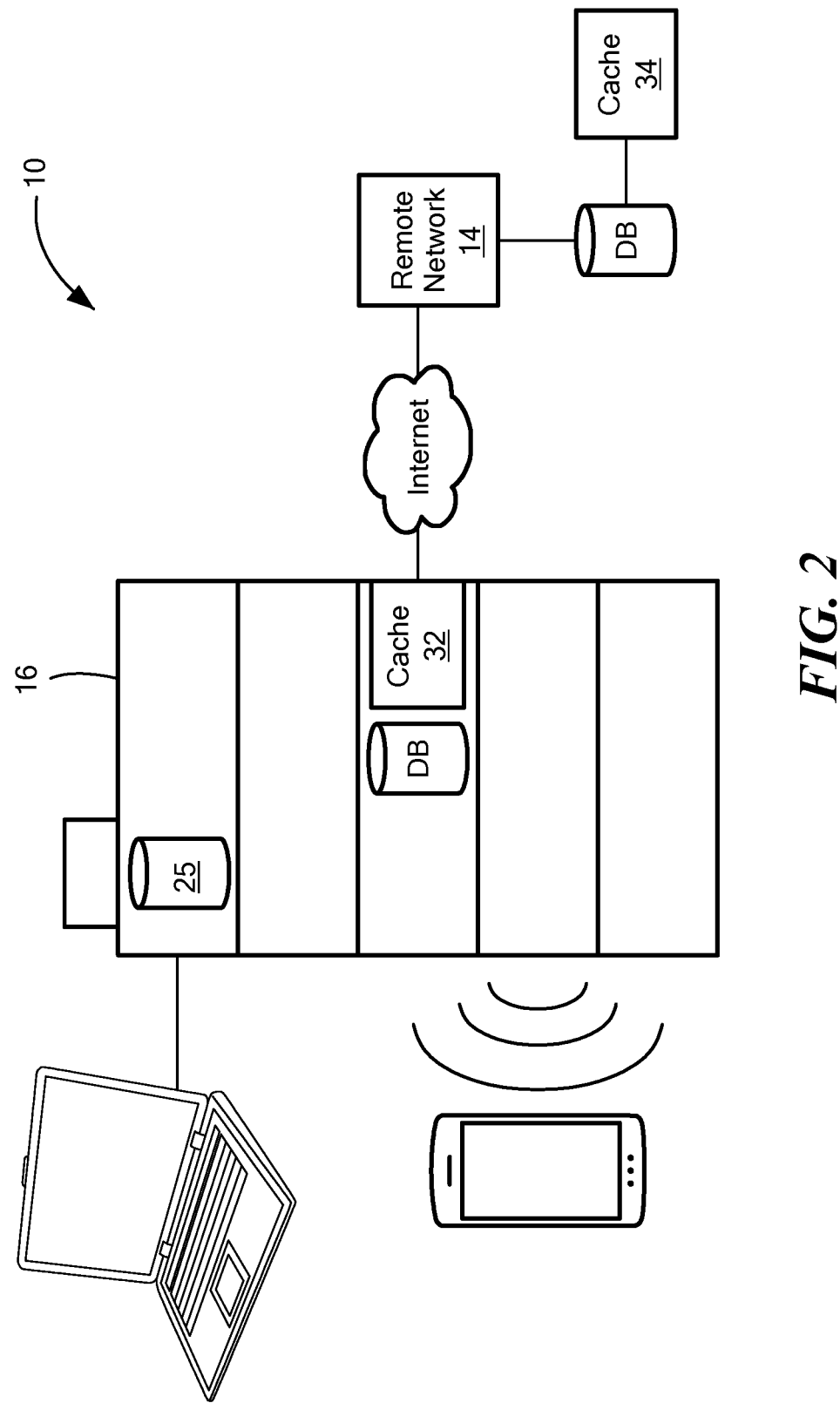
FIG. 2 is a schematic view of the mobile secure network system and device of FIG. 1.

Referring initially to FIGS. 1 and 2, the present disclosure is directed to a physically and electronically protected mobile security system and device 10 for housing a computing apparatus 12, which provides a secure extension of a remote home network 14, to a current location of the computing apparatus. As used herein the term "computing apparatus" refers to the electronic equipment housed within the mobile security device for use with the home network, including but not limited to servers, patch panels, routers, and switches. The mobile security system 10 includes an enclosure, i.e. housing 16 enclosing the computing apparatus 12 having a door 18 to access the computing apparatus 12, access control mechanism 24 to secure the door 18 in a closed position relative to the housing 16, and a security control module 25 to protect the data stored on the computing apparatus 12 and provide authentication to access the enclosure 16. Housing 16 may also include support members, for example racks 11 including rails to secure the computing apparatus within the housing 16 and which may be slidable, a back-up power supply 20 supported by the housing 16 and a wireless router 22 to provide wireless network access to the remote home network 14.

In the present embodiment, access control mechanism 24 is in communication with the remote home network 14 to validate requests to unlock the door 18. The access control mechanism 24 may include a credential reader 26 and a locking device 28. The credential reader 26 may be communicationally connected to the door 18, and the locking device 28 may be any of a variety of locking devices including a traditional lock 30. The security control module 25 communicates with the credential reader 26 and the access control mechanism 24 to allow access to the computing apparatus 12 by unlocking the lock 30 upon verification of credentials by the home network 14.

Figure 3:
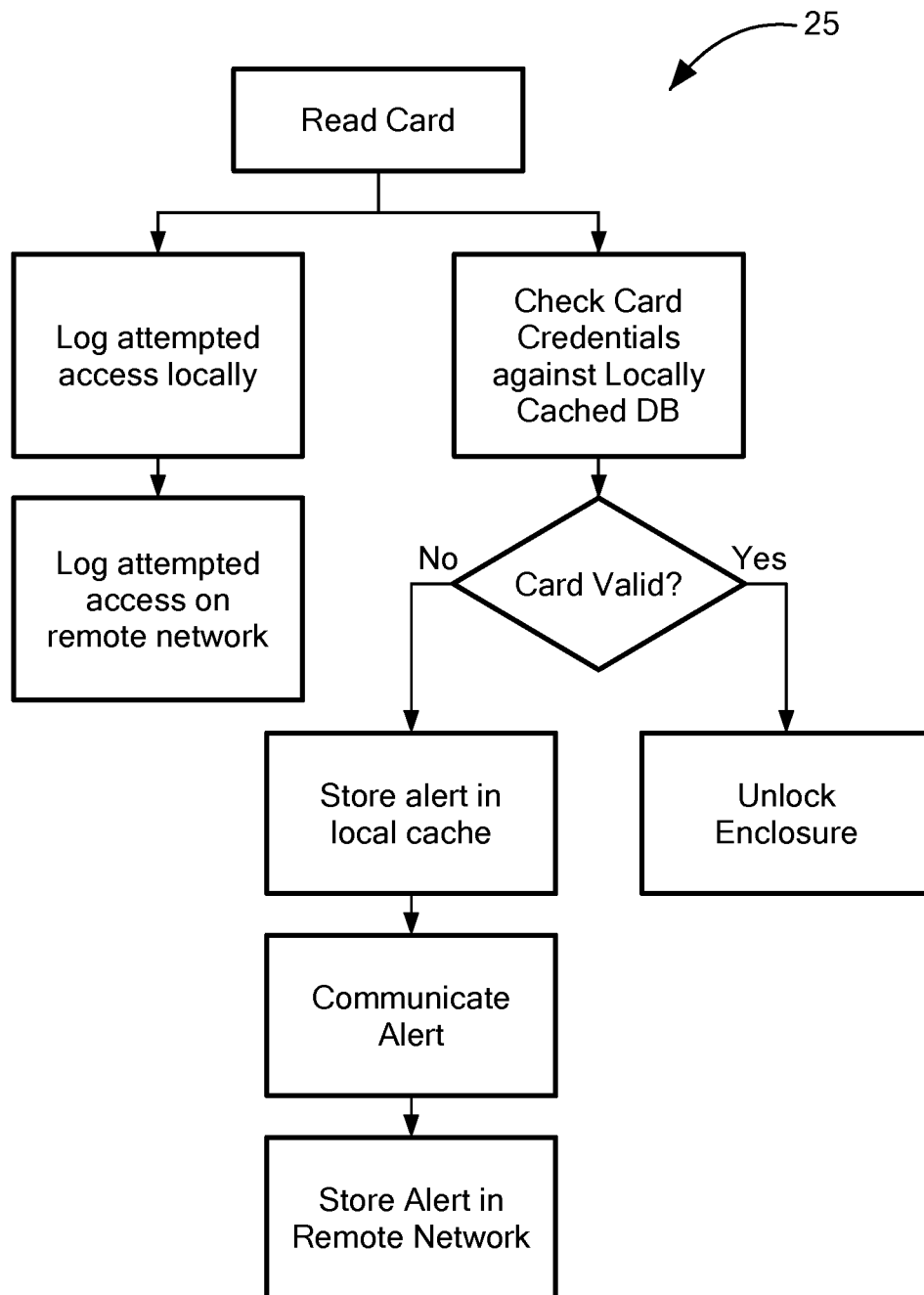
FIG. 3 is a flowchart illustrating an embodiment of a security module and locking mechanism for securing the mobile secure network device according to embodiments disclosed herein.

In one embodiment, as illustrated in FIG. 3, the security control module 25 includes the locally cached database 32 of users with authorization to unlock the housing 16. To gain access to the housing 16 the credentials read by credential reader 26 may be checked against the locally cached database of authorized users. If the user's identity matches those in the locally cached database 32, the card is validated and the door 18 is unlocked. If the user's identity does not match those in the locally cached database 32, the card is invalid and an alert is stored in the local cache, and may also be communicated and stored in the remote home network 14. In this manner, unauthorized attempts to gain access to the mobile security system and device 10 can be stored in an audit log. The local cache 32 can also be configured to track users who have accessed the credential reader 26 and likewise store those who have accessed the mobile security system and device 10 in an audit log, either locally or remotely.

Figure 4:
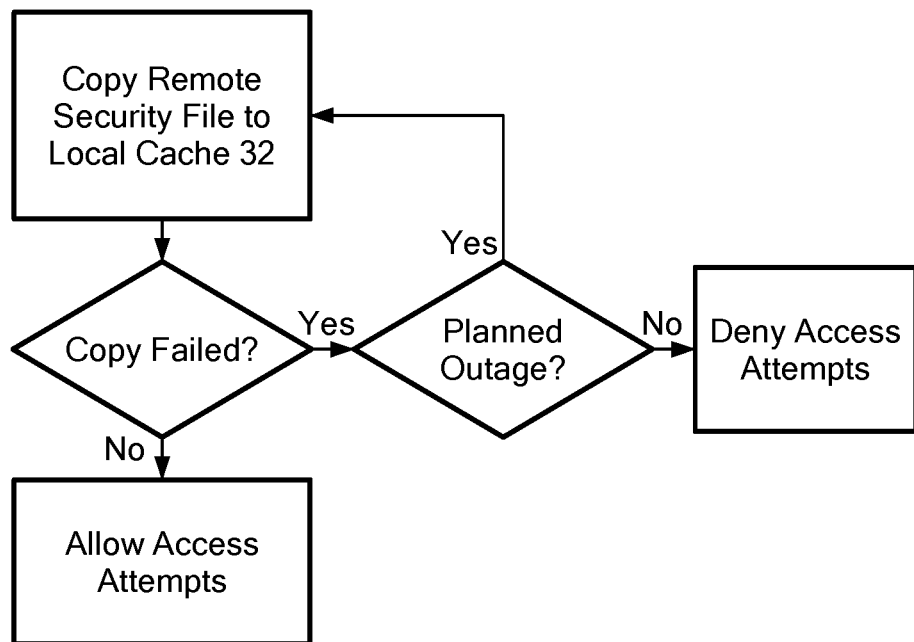
FIG. 4 is a flowchart illustrating an embodiment of the security module for synchronize the local cache with the remote network according to embodiments disclosed herein.
Figure 5:
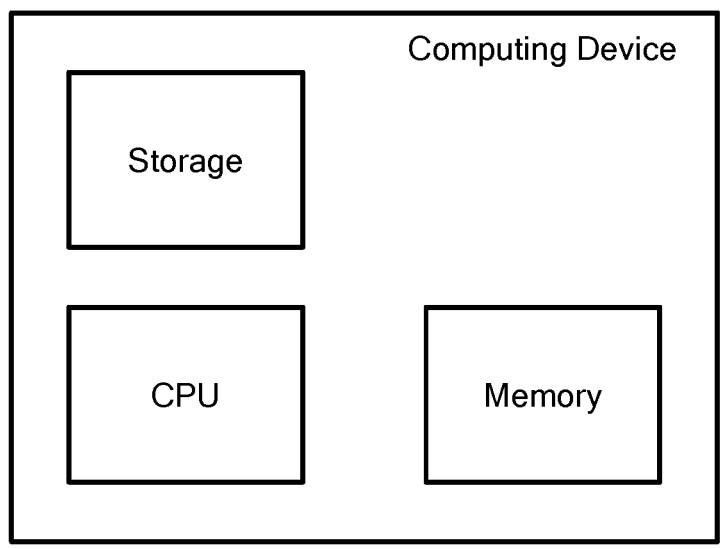
FIG. 5 is a schematic view of mobile secure network device in accordance with FIG. 1.

As illustrated in FIG. 4, the security control module 25 may also be configured to synchronize the local cache 32 with a cache 34 located on the remote home network 14. The local cache 32 may also be used to cache data determined to be unnecessary to sync with the remote home network 14. The access control mechanism 24 may also be configured to deny access to the housing 16 if the security module 26 fails to synchronize the local cache 32 with the cache 34 located on the remote home network 14.

If access is denied by the security control module 25 upon a predefined occurrence, for example from lack of authorization or for failure to synchronize the local cache 32, a shutdown protocol may be initiated. The mobile secure system 10 may include a kill switch 36 to physically disable access to the housing 16 by deactivating the credential reader 26 (for example upon a set number of tries by a user who is not matched to a user in the local cache 32 of users or if synchronization fails). In one embodiment, when the kill switch 36 is activated it also clears (i.e. wipes, deletes, destroys) the data stored on the local cache 32 and disables access to the remote home network 14. A fail secure device 38 may be provided in order to signal a forced breach of the mobile secure network device 10 and activate the kill switch. The fail secure device 38 may be any known device that activates a signal upon a physical breach, including for example a glass shatter sensor, a lock sensor, and/or a power sensor.

In case of an emergency, where removal of the computing apparatus 12 from the housing 16 is desired, an emergency key that allows removal of the computing apparatus 12 may be provided. The emergency key in the present embodiment is a physical key, which may be stored remotely from the housing in a secure location, and that can be used to access a lock disposed on the back of the housing in case the electronic lock fails. Accessing the housing 16 from the back allows the user to access the inside of the housing to remove the side panel, and/or dismantle the computing apparatus 12 that is rack mounted from the inside out. When entering the housing with the credential reader 26 and locking device 28 from the front, access is provided but removal of the computing apparatus 12 is not readily feasible. In addition, a tamper indicator, for example tamper tape or a pressure sensor may be provided to indicate rear access to the housing, which can afterwards be reset electronically and/or physically. For example, if a pressure sensor is used, it would first need to be placed into its original position and then electronically reset. If tamper tape is utilized it would need to be physically replaced. Accordingly, when the emergency key is utilized it would be evident.

The computing apparatus 12 may include a server 40 that communicates with the remote home network 14 over a secure network channel, for example a VPN channel or a local wireless network. The local wireless network may include a WiFi network, a cellular network, and/or a mesh network, or similar network. The computing apparatus may further include a global positioning system 42 supported by the housing 16 so that the location of the secure network device 10 can be tracked remotely as desired.

The mobile security system and device 10 provides a physically secured network device that allows anyone to extend their network anywhere in the world with access to power. Caching and bandwidth optimization within the router makes it possible for the system to operate as a full local datacenter environment in a remote location, even with very slow internet, because bandwidth optimization can synchronize the local cache as usage permits, while authorization requests are sent directly to the home datacenter as higher priority traffic. The mobile security system may be rolled into an area with no internet connection and be self-sufficient and secured. The mobile device has integrated logical and physical security and has the capability of being fully portable.

Those skilled in the art will appreciate that the conception, upon which this disclosure is based, may readily be utilized as a basis for designing other products without departing from the spirit and scope of the invention as defined by the appended claims. Therefore, the claims are not to be limited to the specific examples depicted herein. For example, the features of one example disclosed above can be used with the features of another example. Furthermore, various modifications and rearrangements of the parts may be made without departing from the spirit and scope of the underlying inventive concept. Thus, the details of these components as set forth in the above-described examples, should not limit the scope of the claims.

Additionally, the purpose of the Abstract is to enable the U. S. Patent and Trademark Office, and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the claims of the application nor is intended to be limiting on the claims in any way.

What is claimed is:

1. A mobile secure network system comprising:
    a computing apparatus configured to extend a remote home network to a current location of a network device so that one or more endpoint devices at the current location of the network device can join the remote home network;
    a housing supporting the computing apparatus and including a door to access the computing apparatus, the housing being constructed and arranged for mobile transport and including a back-up power supply supported thereon;
    an access control mechanism to secure the housing including a credential reader communicationally connected to the door and a locking device to secure the door in a locked position, the locking device movable between a locked and unlocked position to allow access to the computing apparatus;
    a security control module communicationally connected to the access control mechanism and constructed and arranged to deny access to the housing upon occurrence of one or more predefined occurrences and further comprises a local cache configured to cache data remotely that has not yet been synced with the remote home network, and the security module is configured to synchronize the data on the local cache with the remote home network; and
    wherein upon access to the housing being denied by the security control module a shutdown protocol is initiated to secure the computing apparatus.

2. The system of claim 1, wherein the predefined occurrences are selected from a group including unverified users attempting to gain access to the computing apparatus through the access control mechanism, failure to synchronize a local cache with a remote cache on the parent network, a physical breach of the housing, and power loss.

3. The system of claim 1, further comprising a local cache supported by the housing, the local cache including a listing of users who are authorized to access the computing apparatus.

4. The system of claim 3, wherein the local cache further includes a log of users who have accessed the credential reader.

5. The system of claim 3, wherein to verify the users' credentials data representing the user is compared to the local cache of authorized users and, upon finding a match the door is unlocked.

6. The system of claim 5, wherein the shutdown protocol is initiated upon a predetermined number of tries by a user who is not verified upon comparison to the local cache of authorized users.

7. The system of claim 1, wherein upon a reduction in bandwidth the security control module prioritizes the order in which data on the local cache is synchronized with the home network, with high priority activities being synchronized first and lower priority activities being synchronized afterwards with any remaining bandwidth.

8. The system of claim 7 wherein synchronizing a log of users who have accessed the credential reader with the home network and authorizing users who are attempting to access the computing apparatus are high priority activity and synchronizing other cached data from the local cache to the home network are lower priority activities.

9. The system of claim 1, wherein the access control mechanism is configured to deny access to the housing if the security module fails to synchronize the local cache with the remote home network.

10. The system of claim 1, further comprising a kill switch to disable access to the housing by deactivating the credential reader upon initiation of the shutdown protocol.

11. The system of claim 1, further comprising a kill switch activated to clear the local cache and disable access to the remote home network upon a signal received due to a forced breach of the mobile secure network device from a fail secure device.

12. The system of claim 11, wherein the fail secure device is selected from the group comprising a glass shatter sensor, a lock sensor, and a power sensor.

13. The system of claim 1, further comprising a global positioning system supported by the housing wherein location of the secure network device can be tracked remotely.

14. A mobile secure network device comprising:
a computing apparatus configured to extend a remote home network to a current location of a network device so that one or more endpoint devices at the current location of the network device can join the remote home network;
a local cache of data stored by the computing apparatus;
a housing supporting the computing apparatus and including a door to access the computing apparatus, the housing being constructed and arranged for mobile transport and including a back-up power supply supported thereon;
an access control mechanism to secure the housing including a locking device to secure the door in a locked position, the locking device movable between a locked and unlocked position to allow access to the computing apparatus;
a security control module communicationally connected to the access control mechanism and constructed and arranged to deny access to the housing upon occurrence of one or more predefined occurrences;
wherein the predefined occurrences are selected from a group including unverified users attempting to gain access to the computing apparatus through the access control mechanism, failure to synchronize a local cache with a remote cache on the home network, a physical breach of the housing, and power loss; and
wherein upon access to the housing being denied by the security control module a shutdown protocol is initiated to physically secure the housing and secure the data contained on the local cache.

15. The device of claim 14, wherein to secure the data on the local cache the data is deleted from the local cache and access to the remote home network is disabled.

16. The device of claim 15, wherein prior to deleting the data from the local cache it is transferred to the home network.

17. The device of claim 14, wherein the shutdown protocol is initiated upon a predetermined number of tries by a user who is not verified upon comparison to the local cache including a listing of authorized users.

18. The device of claim 14, further comprising a kill switch to disable access to the housing by deactivating a credential reader communicatively connected to the locking device upon initiation of the shutdown protocol.

19. The device of claim 14, further comprising a fail secure device that when activated provides a signal to the security control module to delete the local cache and disable access to the remote home network.

20. The device of claim 14, wherein the fail secure device is selected from the group comprising a glass shatter sensor, a lock sensor, and a power sensor.

21. A mobile secure network device comprising:
a computing apparatus configured to extend a remote home network to a current location of a network device so that one or more endpoint devices at the current location of the network device can join the remote home network;
a local cache of data stored by the computing apparatus;
a housing supporting the computing apparatus and constructed and arranged for mobile transport;
an access control mechanism constructed and arranged to secure the housing from unauthorized access;
a security control module communicationally connected to the access control mechanism and constructed and arranged to deny access to the housing upon occurrence of one or more predefined occurrences selected from a group including unverified users attempting to gain access to the computing apparatus through the access control mechanism, failure to synchronize a local cache with a remote cache on the home network, a physical breach of the housing, and power loss; and
a kill switch activated upon a signal received from a fail secure device to clear the local cache and disable access to the remote home network.

22. The device of claim 21, wherein the housing includes a door and the access control mechanism includes a credential reader communicationally connected to the door and a locking device to secure the door in a locked position.

* * * * *